United States Patent [19]
Sawada et al.

[11] Patent Number: 5,346,752
[45] Date of Patent: Sep. 13, 1994

[54] HEAT-RESISTANT MOISTUREPROOF FILM

[75] Inventors: Tsutomu Sawada; Shinichi Ohashi; Shigenobu Yoshida, all of Tsuchiura, Japan

[73] Assignee: Mitsubishi Kasei Corporation, Tokyo, Japan

[21] Appl. No.: 859,702

[22] PCT Filed: Oct. 17, 1991

[86] PCT No.: PCT/JP91/01417
§ 371 Date: Jul. 29, 1992
§ 102(e) Date: Jul. 29, 1992

[87] PCT Pub. No.: WO92/06842
PCT Pub. Date: Apr. 30, 1992

[30] Foreign Application Priority Data

Oct. 17, 1990 [JP] Japan .................................. 2-278406

[51] Int. Cl.$^5$ .......................... B32B 9/00; B32B 7/02; B32B 27/30; B65D 65/40
[52] U.S. Cl. ........................................ 428/216; 428/1; 428/349; 428/516; 428/690; 428/910; 428/913; 428/917; 428/918
[58] Field of Search ................... 428/1, 216, 349, 516, 428/917, 918, 690, 913, 910

[56] References Cited

U.S. PATENT DOCUMENTS 5,107,175  4/1992  Hirano et al. ................. 428/917
5,124,204  6/1992  Yamashita et al. ............. 428/917

FOREIGN PATENT DOCUMENTS 0049083  4/1982  Japan .
0372489  6/1990  Japan .

OTHER PUBLICATIONS

Database WPIL, Derwent Publications Ltd., London, GB; & JP-A-61-079 646 (Sumitomo Bakelite, K. K.) *abstract*.

Primary Examiner—P. C. Sluby
Attorney, Agent, or Firm—AcAulay Fisher Nissen Goldberg & Kiel

[57] ABSTRACT

A heat-resistant moistureproof film having a first layer (A), a second layer (B) bonded to one side of the first layer, and a third layer (C) bonded to the other side of the first layer. The first layer (A) is a single or a laminate of a transparent laminated film having a base film composed of PVA having a saponification degree of not less than 99 mol % and a transparent silicon oxide thin film (SO thin film) 2 formed on at least one side thereof. The second layer (B) is a single or a laminate of a transparent plastic film other than a PVA film, having at least one layer of the plastic film with a transparent SO thin film 4 having a thickness of 100 to 5000 Å formed on at least one side thereof, and at least one layer of a transparent heat-resistant film having the sum of the absolute values of the percentages of heat-shrinkage in the machine direction and transverse direction when heated at 150° C. for 30 minutes, of not more than 1% and a light transmittance of not less than 85% by ASTM D-1003. The the third layer (C) is a heat-sealable resin layer.

16 Claims, 2 Drawing Sheets

HEAT-RESISTANT MOISTUREPROOF FILM

TECHNICAL FIELD

The present invention relates to a heat-resistant moistureproof film and, more particularly, to a transparent heat-resistant moistureproof film which has a high heat-resistance and such a high resistance to moisture as not to allow almost any gas such as steam to permeate therethrough.

A heat-resistant moistureproof film according to the present invention is composed of a laminated plastic film and is suitable as a packaging film for an electroluminescence device which is used for a back light of a liquid crystal display.

BACKGROUND ART

The liquid crystal display devices have a distinguishing characteristic allowing operation at a low electric power comsumption and due to this advantage, liquid crystal devices are used in various fields including OA machines.

Use of organic dispersing electroluminescent devices (hereinunder referred to as "EL devices"), which are thin and light-weight, is becoming wide spread for inexpensive lights (auxiliary light sources) of plane-luminescence used for liquid crystal devices.

Since EL devices include fluorecent materials such as Zns:Mn, Zns:Cu etc., the EL devices are packaged in a transparent film which has a high resistance to moisture because the luminance is greatly lowered by moisture.

Two laminated moistureproof films each having a sealant layer on one side thereof which can be heat-sealed, are generally used as a packaging film for EL devices. An EL device which is inserted between the sealant layers of the two laminated moistureproof films, is passed through a vertical pair of heated rollers at an appropriate nip pressure so as to heat-seal the sealant layers surrounding the EL device.

A laminated film having a fluorinated resin film, especially, a film containing polychlorotrifluoroethylene (hereinunder referred to as "PCTFE") as the main ingredient is often used as a packaging film due to its excellent resistance to moisture and transparency.

Such a laminated film is generally produced by laminating polyolefin having 20 to 100 μm in thickness as a sealant for heat-sealing on a PCTFE film having 70 to 300 μm in thickness, and it is said to have the highest resistance to moisture of all the existent transparent films because it hardly allowing steam to permeate.

A transparent laminated plastic film produced by forming a transparent metal oxide especially, silicon or aluminum oxide thin film on the surface of a transparent plastic base film, has recently been commercialized as a packaging material having a gas barrier-property.

However, the laminated film having a film containing PCTFE as the main ingredient is so expensive that the manufacturing cost of a back light becomes high. In addition, since the moisture resistance of such a laminated film is lowered when the ambient temperature exceeds 50° C., the life of the EL device packaged therein is extremely shortened when it is used at a high temperature.

On the other hand, the moisture resistance of the transparent laminated plastic film having a transparent metal oxide thin film on the surfaces thereof is insufficient, so that it has not been used as a packaging film for an EL device yet. In addition, the present inventors have found that the packaging films are treated by heat-rollers of 110° to 150° C. in the EL device sealing process, however according to some of the base films used for these packaging films, the moisture resistance thereof deteriorates by the heat-treatment.

Development of a transparent plastic film which is suitable to a packaging film and which is cheaper and has higher moisture resistance than a PCTFE film, has therefore been demanded.

SUMMARY

Accordingly, it is an object of the present invention to solve the above-described problems in the prior art and to provide a heat-resistant moistureproof laminated plastic film which has excellent strength, heat-resistance and economical efficiency as well as excellent transparency and moisture resistance.

As a result of studies undertaken by the present inventors so as to attain the above-mentioned object, the following have been found.

(1) A film produced by forming a silicon oxide thin film on the surface of a specific polyvinyl alcohol base film, and protecting the thus-obtained film having excellent transparency and moisture resistance by another transparent plastic film coated with a silicon oxide thin film formed thereon, has a stable moisture resistance which can be maintained for a long time even in a high-temperature and high-humidity atmosphere.

(2) By using a film having specific physical properties as another transparent plastic film, the inherent gas barrier property thereof is maintained in spite of heating and pressurizing to the thus-obtained film during the EL device sealing process, so that the deterioration of the moisture resistance thereof is effectively prevented.

The present invention has been achieved on the basis of this finding. To sum up, the present invention relates to a heat-resistant moistureproof film comprising a first layer (A), a second layer (B) bonded to one side of the first layer, and a third layer (C) bonded to the other side of the first layer, the first layer (A), the second layer (B) and the third layer (C) being defined in the following:

(a) the first layer (A) is a single or a laminate of a transparent laminated film comprising a base film composed of a polyvinyl alcohol having a saponification degree of not less than 99 mol % and a transparent silicon oxide thin film formed on at least one side of the base film;

(b) the second layer (B) is a single or a laminate of a transparent plastic film other than a polyvinyl alcohol film, comprising at least one layer of the plastic film with a transparent silicon oxide thin film of 100 to 5000 Å in thickness formed on at least one side thereof, and at least one layer of a transparent heat-resistant film having the sum of the absolute values of the percentages of heatshrinkage in the machine direction and transverse direction when heated at 150° C. for 30 minutes, of not more than 1% and a light transmittance of not less than 85% by ASTM D-1003; and (c) the third layer (C) is a heat-sealable resin layer.

DETAILED DESCRIPTION OF THE INVENTION

The present invention will be explained in detail in the following.

A heat-resistant moistureproof film according to the present invention comprises a first layer (A), a second layer(B) bonded to one side of the first layer and a third layer (C) bonded to the other side of the first layer.

Each layer will be explained in order.

(1) First layer (A)

In a heat-resistant moistureproof film according to the present invention, the first layer (A) is a single or a laminate of a transparent laminated film comprising a base film composed of a polyvinyl alcohol (hereinunder referred to as "PVA") having a saponification degree of not less than 99 mol % and a transparent silicon oxide thin film (hereinunder referred to as "SO thin film") formed on at least one side thereof.

It is necessary that the PVA base film is composed of PVA having a saponification degree of not less than 99 mol %. If a film composed of PVA having a saponification degree of less than 99 mol % is used as a base film, it is difficult to obtain excellent moisture resistance even if an SO thin film is formed on the surface thereof.

The PVA film may either be an unstretched film or a stretched film. PVA film which is biaxially stretched to about 3×3 times is preferable from the viewpoint of film strength and moisture resistance. The thickness of the PVA film is in the range of 5 to 400 μm, preferably 10 to 200 μm.

The SO thin film may be formed either on one side or both sides of the PVA film. But, in order to maintain the high moisture resistance for a long time, the SO thin film is preferably formed only on the surface on which the second layer (B) which functions as a protective layer, is laminated.

The SO thin film may be formed by any method of the vacuum deposition, sputtering and ion plating of silicon oxide, silicon dioxide or a mixture thereof as a depositing raw material. Alternatively, the reactive deposition method of silicon, silicon oxide, silicon dioxide or a mixture thereof while supplying oxygen gas, may be adopted.

It is possible to use an anchor coating agent prior to the formation of the SO thin film in order to enhance the adhesion strength between the SO thin film and the base film. As preferable anchor coating agents, isocyanate adhesion promoters, polyethyleneimine adhesion promoters, organic titanium adhesion promoters, polyurethane adhesives and polyester adhesives may be exemplified. Solvent-free adhesives such as polyethylene adhesives, polyester adhesives and polyamide adhesives may also be used as the anchor coating agent.

The SO thin film may contain not more than 10 wt % of impurities such as calcium, magnesium, and oxides thereof since the intended moisture resistance thereof extremely deteriorates.

The thickness of the SO thin film is in the range of 100 to 5000 Å. If the thickness of the SO thin film is less than 100 Å, the moisture resistance of the laminated film produced-becomes insufficient. On the other hand, if the thickness exceeds 5000 Å, curling is produced on the laminated film, or the SO thin film itself is apt to cause cracking or separation.

The first layer (A) may be either a single film of the above-described transparent laminated film composed of the PVA base film with the transparent SO thin film formed on a one side thereof, or a laminate of at least two films of such transparent laminated films bonded to each other by a transparent adhesive. As the adhesive for bonding the single film with each other, urethane adhesives, acrylic adhesives and polyester adhesives, for example, are usable.

(2) Second layer (B)

The second layer (B) is bonded to one side, preferably, the SO thin film of the first layer (A).

The second layer (B) functions as a protective layer, and is composed of a single or a laminate composed of a transparent plastic film other than a PVA film. In the second layer (B), a transparent silicon oxide thin film of 100 to 5000 Å in thickness is formed on at least one side of at least one plastic film which constitutes the second layer (B).

In addition, the second layer (B) includes at least one film of a transparent heat-resistant film.

The transparent heat-resistant film in the present invention is a film having the sum of the absolute values of the percentages of heat-shrinkage in the machine direction and transverse direction when heated at 150° C. for 30 minutes of not more than 1% and a light transmittance of not less than 85% by ASTM D-1003 (hereinunder the light transmittance measured by ASTM D-1003 will be omitted to as "light transmittance").

The percentage of heat-shrinkage is measured after the film is heated for 30 minutes in a hot-air oven in which the temperature is set at 150° C.

The transparent plastic film other than a PVA film is not specified. For example, polyethylene terephthalate film, polyacetate film, polypropylene film and polyamide film are usable. The following heat-resistant transparent films are also usable as the transparent plastic film other than a PVA film. Especially, a biaxially oriented polyethylene terephthalate film is preferable as the transparent plastic film other than a PVA film.

The material resin of the transparent heat-resistant film used for the second layer (B) is not limited so long as it has the above-described properties. Polysulfones, polyarylates and polyimides, for example, are usable as the material resin of the transparent heat-resistant film.

As the polysulfones, aromatic polysulfones each having a sulfone bond and an ether bond in the main chain, and having an aromatic residue represented by the following formulas (a) to (d), which is bonded between these bonds are preferably used from viewpoint of heat resistance:

(a)

(b)

(c)

(d)

Examples of such aromatic polysulfone resins are resins having repeating units represented by the following formulas (1) to (10):

(1)

(2)

(3)

(4)

(5)

(6)

(7)

(8)

(9)

(10)

Among these, an aromatic polysulfone film having the repeating unit (1) and an aromatic polysulfone film having the repeating unit (2) are preferably used because they are easily commercially available.

The polymerization degrees (n) in the above repeating units represented by the formulas (1) to (10) are not specified, if they allow the formation of a film. But, it is preferred that the polymerization degree (n) in the resin having the repeating unit (2) is in the range of 100 to 160 and that the polymerization degree (n) in the resin having the repeating unit (1) is in the range of 50 to 80.

As the polyarylate, polycondensates of bivalent phenol and aromatic dicarboxylic acid are usable. For example, various resins having repeating units represented by the following formulas (11) to (16) are usable. In the following chemical formulas, (BIS A) represents a bisphenol residue.

(11)

——————————————————— (BIS A)

(12)

(13)

(14)

(15)

(16)

The polymerization degrees (n) in the above repeating units represented by the formulas (11) to (16) are not specified, if they allow the formation of a film. But it is preferred that the polymerization degree (n) in a resin having the repeating unit (11) is in the range of 50 to 110.

Among these, a polyarylate film having the repeating unit (11) is preferably used because it is easily commercially available.

As the polyimide, in addition to a polyimide in a narrow sense, that is, a polyimide having only an imide bond in the main chain, a polyether imide having an imide bond and an ether bond in the main chain, and a polyamideimide having an imide bond and amide bond in the main chain are usable. Among these, aromatic polyimides having an aromatic residue represented by the following formulas (e) to (g), which is bonded between the above-described bonds are preferably used from the viewpoint of heat-resistance:

(e)

(f)

(g)

As the polyimide, various resins having repeating units represented by the formulae (17) to (19) are usable. A resin having a repeating unit represented by the following formula (17) is polyimide, a resin having a repeating unit represented by the following formula (18) is polyether imide and a resin having a repeating unit represented by the following chemical formula (19) is polyamideimide.

Some of the commercially available polyimide films are colored films, but any of the films having a light transmittance of not less than 85% is usable in the present invention.

(17)

(18)

(19)

In the present invention, a film composed of a resin having the repeating unit (1) (generally called a polyether sulfone) is the most preferable. Since the solvent resistance of a film composed of a resin which is generally called a polysulfone and has the repeating unit (2) or a polyarylate is not always sufficient, when the film is bonded to another film by a dry-lamination method as described later, the surface of the film is easily eroded. But, a film composed of the polyether sulfone is free from such problem.

The thickness of the transparent heat-resistant plastic film which constitutes the second layer (B) is not specified, but it is preferably in the range of 10 to 100 μm.

The heat-resistant moistureproof film of the present invention has in the second layer (B) thereof at least one layer of a transparent heat-resistant film in which the sum of the absolute values of the percentages of heat-shrinkage in the machine direction and transverse direction when heated at 150° C. for 30 minutes is not more than 1%. It is believed to be due to the following function of this transparent heat-resistant film that the heat-resistant moistureproof film of the present invention exhibits excellent moisture resistance.

That is, even if the second layer (B) is a laminate, the percentage of heat-shrinkage of the film as a whole is lowered. As a result, when the heat-resistant moistureproof film is heated during the EL device sealing process, not only is the generation of cracking on the SO thin film of the second layer (B) prevented, but also the shrinkage of the base film of the first layer (A) which is bonded to the SO thin film is suppressed, so that the generation of cracking on the SO thin film on the surface of the base film is effectively prevented.

The transparent heat-resistant film for the second layer (B) has a light transmittance of not less than 85%. Therefore, even if the transparent heat-resistant film of the present invention is laminated on another transparent plastic film, it is possible to maintain such a good transparency as the second layer (B) and to sufficiently transmit the light emitted from the EL device.

The second layer (B) is composed of a single-layer or a laminate of the above-described plastic film(s). If it is a single-layer film, it is necessary that the film itself is constituted the above-described transparent heat-resistant film. On the other hand, if the second layer (B) is a laminate, the transparent heat-resistant film is preferably disposed on the outermost layer. In producing the laminate, an adhesive such as urethane adhesives, acrylic adhesives and polyester adhesives is usable.

A transparent SO thin film is formed on at least one side of at least one layer of a transparent plastic film which constitutes a second layer (B), and the second layer (B) is used as a transparent laminated film. If the second layer (B) is a single-layer film, it is necessary that the SO thin film is formed on one side of the film itself (transparent heat-resistant film) so as to constitute a transparent laminated film. The SO thin film is formed by the above-described method to form an SO thin film on the PVA film. The thickness of the SO thin film is in the range of 100 to 5000 Å. If the thickness of the SO film is less than 100 Å, the moisture resistance becomes insufficient. On the other hand, if it exceeds 5000 Å, curling is produced on the film, or the SO thin film itself is apt to cause cracking or separation.

The second layer (B) is preferably bonded to the first layer (A) in such a manner that the transparent heat-resistant film is exposed on the outer surface. Owing to this structure, the SO thin film itself is protected from scratching or crush, so that the problem of lowering of the moisture resistance which may be caused by the breakage of the SO thin film is eliminated.

(3) Third layer (C)

The third layer (C) is bonded to the first layer (A) on the opposite side of the first layer (A) to the side to which the second layer (B) is bonded, preferably, the surface of the PVA film.

The third layer (C) functions as a sealant and is composed of a heat-sealable resin layer.

As the heat-sealable resin, general resins such as low-density polyethylene, ethylene-vinyl acetate copolymer, polypropylene and ethylene-vinyl acrylate copolymer (ionomer) are usable. When a heat-resistant moistureproof film is required to have a high moisture resistance such as an EL device packaging film, an ethylene-acrylate copolymer (EAA) and an ethylene-ethyl acrylate copolymer (EEA) are preferable in order to prevent moisture permeation through the sealed surface.

The laminate structure of these layers will now be described.

In the case of bonding the second layer (B) and the third layer (C) to the first layer (A), a known method such as a dry-lamination method or an extrusion-lamination method using an adhesive such as urethane adhesives, acrylic adhesives and polyester adhesives is adopted.

In the case of bonding the film as the third layer (C), this film may be either an unstretched film, or a uniaxially or biaxially streched film.

The third layer (C) may be laminated either before or after the formation of the SO thin film of the first layer (A).

The third layer (C) may be formed on the first layer (A), preferably, on the PVA film without using an adhesive by extrusion coating method.

The heat-resistant moistureproof film according to the present invention is used as a packaging film suitable especially as an EL device packaging film, but it is also preferably used as a packaging film for other things which are required to be protected from moisture.

Some contents to be packaged often require that the packaging film has an ultraviolet screening property as well as moisture resistance property. It is possible to impart an ultraviolet screening property, if necessary, to the heat-resistant moistureproof film according to the present invention. For example, it is possible to produce a moistureproof film having an ultraviolet screening property by adding a substance having an ultraviolet absorbing activity to the adhesive layers when the three layers are bonded to each other.

As an ultraviolet absorber, at least one of the commercially available ultraviolet absorbers such as benzophenone and benzotriazole is used, and the amount of ultraviolet absorber used is determined in accordance with the required ultraviolet absorbing activity.

It goes without saying that if a film containing a substance having an ultraviolet screening activity is used as the film constituting each layer, the ultraviolet screening activity is imparted to the transparent moistureproof film of the present invention.

In the transparent moistureproof film of the present invention, the sum of thicknesses of the second layer (B) and the third layer (C) is preferably in the range of 50 to 1000 $\mu$m, and the total thickness of the moistureproof film of the present invention is preferably in the range of 100 to 1100 $\mu$m, more preferably in the range of 150 to 300 $\mu$m from the viewpoint of mechanical strength, flexibility and economical efficiency. The ratio of the thicknesses of the three layers is preferably (A):(B):(C):=1:1 to 2:1 to 10.

It is possible to incorporate a transparent plastic film between the first layer (A) and the second layer (B), or between the first layer (A) and the third layer (C) in order to adjust the total thickness of the moistureproof film. Although the plastic film to be incorporated is not specified so long as it is transparent, a film of the same kind as the film which constitutes the second layer (B), is preferably used. The thickness of the plastic film to be incorporated is selected with due consideration of the total thickness of the moistureproof film.

An example of the structure of the moistureproof film of the present invention will be explained hereinunder.

In the following explanation, "SO thin film" means a transparent SO thin film and "film" means a transparent heat-resistant film defined in the present invention unless specified otherwise.

Figure 1:
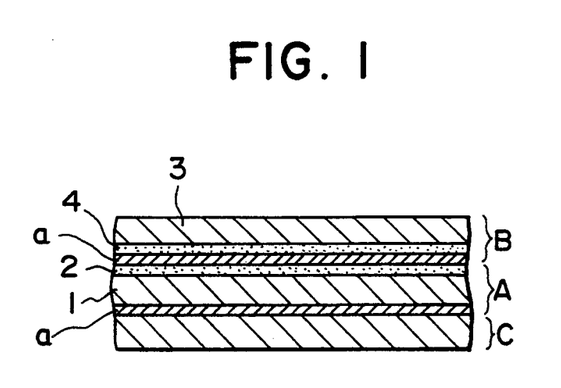
FIG. 1 is a cross-sectional view of one embodiment of the present invention.

FIG. 1 shows the fundamental structure of a heat-resistant moistureproof film according to the present invention.

The first layer (A) is a single-layer of a transparent laminated film produced by forming an SO thin film 2 on one side of a PVA film 1. The second layer (B) is composed of a single-layer of a transparent laminated film produced by forming an SO thin film 4 on one side of a film 3 and is bonded to the SO thin film 2 of the first layer (A) through an adhesive layer (a), so that the SO thin film 4 faces inside. The third layer (C) composed of a heat-sealable resin is bonded to the PVA film 1 of the first layer (A) through an adhesive layer (a).

Figure 2:
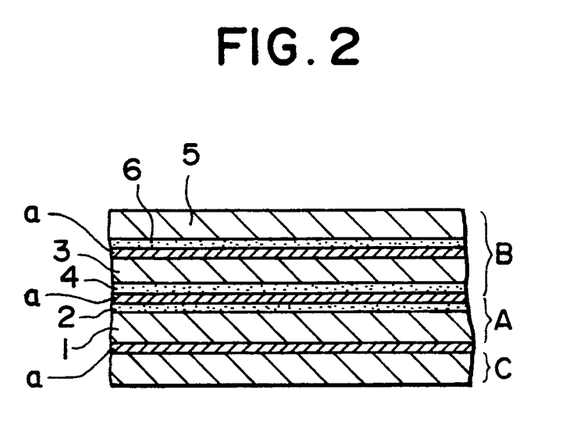
FIG. 2 is a cross-sectional view of a second embodiment of the present invention.

FIG. 2 shows another structure example of a heat-resistant moistureproof film according to the present invention. This example shows a film in which a laminate of two films is used as the second layer (B) in the structure example in FIG. 1.

In the second layer (B) shown in FIG. 2, a laminated film composed of a film 5 and an SO thin film 6 formed on one side thereof is bonded to a transparent laminated film which is produced by forming the SO thin film 4 on one side of the film 3, through an adhesive layer (a) so that the SO thin film 6 faces inside. The second layer (B) composed of this laminate is bonded to the SO thin film 2 of the first layer (A) through the adhesive layer (a), so that the SO thin film 4 faces inside.

In the structure shown in FIG. 2, the film 3 may be a transparent plastic film other than the transparent heat-resistant film defined in the present invention.

Figure 3:
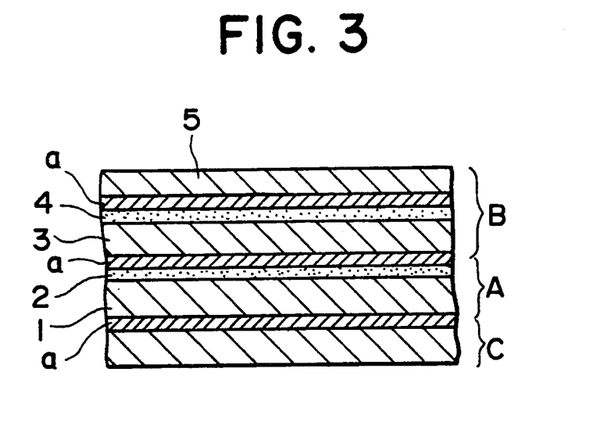
FIG. 3 is a cross-sectional view of a third embodiment of the present invention.

FIG. 3 shows still another structure example of a heat-resistant moistureproof film according to the present invention. In this example, a laminate of two films is used as the second layer (B) in the same way as in the structure shown in FIG. 2. This example is different from that shown in FIG. 2 in that only one layer of the SO thin film is formed in the second layer (B).

In the second layer (B) shown in FIG. 3, a film 5 without forming any SO thin film is bonded through the adhesive layer (a) to the SO thin film 4 of the transparent laminated film produced by forming the SO thin film 4 on one side of the film 3. The second layer (B) constituted by this laminate is bonded to the SO thin film 2 of the first layer (A) through the adhesive layer (a), so that the film 3 faces inside.

In the structure shown in FIG. 3, the film 3 may also be a transparent plastic film other than the transparent heat-resistant film defined in the present invention.

Figure 4:
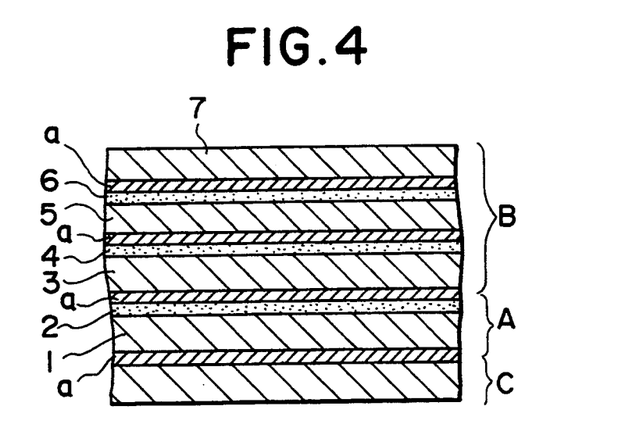
FIG. 4 is a cross-sectional view of a fourth embodiment of the present invention.

FIG. 4 shows a further structure example of a heat-resistant moistureproof film according to the present invention. In this example, a laminate is used as the second layer (B) in the same way as in the structures shown in FIGS. 2 and 3. This example is different from those shown in FIGS. 2 and 3 in that an ordinary transparent plastic film which does not have a high heat-resistance, is incorporated, thereby obtaining the laminate composed of the three transparent plastic films.

In the second layer (B) shown in FIG. 4, an ordinary transparent plastic film 5 not having a high heat resistance with the SO thin film 6 formed on one side thereof is bonded to the SO thin film 4 of the transparent laminated film produced by forming the SO thin film 4 on one side thereof, through an adhesive layer (a), so that the film 5 faces inside, and a film 7 without forming a SO thin film is bonded to the SO thin film 6 through the adhesive layer (a). The second layer (B) constituted by this laminate is bonded to the SO thin film 2 of the first layer (A) through the adhesive layer (a), so that the film 3 faces inside.

In the structure shown in FIG. 4, the film 3 may also be a transparent plastic film other than the transparent heat-resistant film defined in the present invention.

Figure 5:
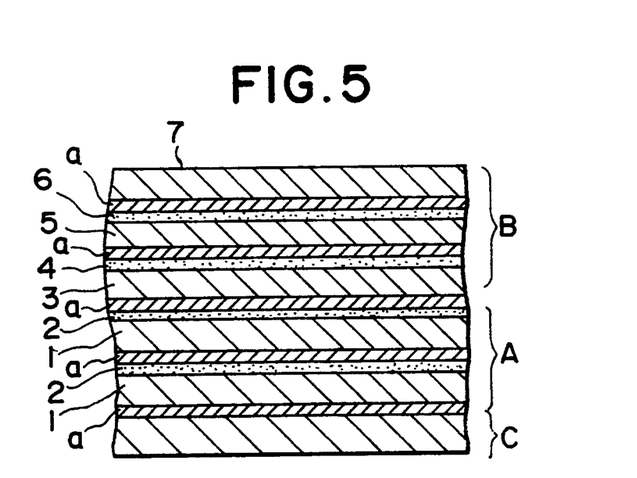
FIG. 5 is a cross-sectional view of a fifth embodiment of the present invention.

FIG. 5 shows a still further structure example of a heat-resistant moistureproof film according to the present invention. This example shows a film in which a laminate is used as the first layer (A) in the structure example shown in FIG. 4.

Two transparent laminated films each produced by forming the SO thin film 2 on one side of the PVA film 1 are bonded to each other through an adhesive layer (a), thereby obtaining a laminate as the first layer (A). The second layer (B) composed of the three layers as shown in FIG. 4 is bonded to the SO thin film 2 of the first layer (A) through the adhesive layer (a), so that the film 3 faces inside.

In the heat-resistant moistureproof film according to the present invention, the moisture resistance as the fundamental function is realized by the protection of the SO thin film formed on the surface of the PVA film of the first layer (A) by means of the second layer (B).

The excellent moisture resistance is believed to be realized on the basis of the following action.

The bonding energy of silicon of the SO thin film formed on a PVA film generally exhibits a specific value in the direction of thickness of this thin film. In the vicinity of the PVA film, silicon has a larger bonding energy than in the surface layer portion or in the intermediate portion of the SO thin film. The PVA film with such an SO thin film formed thereon has an excellent moisture resistance at normal temperatures.

In a high-temperature and high-humidity atmosphere, however, the PVA film moistens and the dimensions thereof change, so that the SO thin film formed on the surface of the PVA film is broken and the inherent moisture resistance is impaired. This problem is solved by protecting the PVA film by another film, but the moisture resistance of an ordinary film, polyvinylidene chloride (PVDC) film or a PVDC-coated film greatly deteriorates at a high temperature, and such a film is hardly expected to have a preventing effect to the moisture absorption of the PVA film at a temperature of not lower than 50° C.

In contrast, in a transparent laminated film having an SO thin film used as the second layer (B) in the present invention, the moisture resistance thereof is lowered only slightly at a high temperature, so that it can effectively protect a transparent film of the first layer (A) and maintain the excellent moisture resistance of a PVA film with an SO thin film formed thereon even in a high temperature range.

The heat-resistant moistureproof film according to the present invention includes a transparent heat-resistant film having the sum of the absolute values of the percentages of heat-shrinkage in the machine direction and transverse direction when heated at 150° C. for 30 minutes, of not more than 1%. For this reason, it is considered that during the EL device sealing process, for example, not only is the generation of cracking on the SO thin film of the second layer (B) prevented, but also the shrinkage of the base film of the first layer (A) which is bonded to the SO thin film is suppressed, so that the generation of cracking on the SO thin film on the surface of the base film is effectively prevented.

Accordingly, the heat-resistant moistureproof film according to the present invention is usable as a packaging film not only for back light of a liquid crystal display but also for an EL device which is used in an automobile or an illumination.

The present invention will be explained in more detail with reference to the following examples and comparative examples, but it is to be understood that the present invention is not restricted to these examples.

In the following examples, the physical properties were measured by the following methods.

(1) Thickness of SO thin film

The thickness of an SO thin film was measured by a quartz film thickness tester.

(2) Percentage (%) of heat-shrinkage

A film was heated in a hot-air oven at 150° C. for 30 minutes, and the percentage of heat-shrinkage of the film was obtained from the change in the dimensions of the film in the machine and transverse directions after heating.

(3) Moisture permeability $(gr/m^2 \cdot 24H)$

A three-side sealed bag 70×70 mm in dimensions (sealing width: 5 mm) was made of a moistureproof film. Thick paper having a high moisture-absorbing property and in the absolutely dry state was inserted into the bag instead of an EL device. The remaining side was sealed by passing the bag through two heating rubber rollers, thereby preparing a sample with thick paper enclosed therein. The sealing conditions were a heating temperature of 150° C. and a rolling pressure of 10 Kg/cm.

10 samples with thick paper enclosed therein were left to stand in an atmosphere of 50° C. and 90% RH for about 500 hours, and the moisture permeability of each moistureproof film was obtained from a change in the total weight.

(4) Transparency (%)

The visible light transmittance of the film was measured by a spectrophotometer produced by Hitachi Ltd., and the transparency was expressed by the light transmittance at 550 nm.

EXAMPLE 1

The following films were used in this example.
Laminated film (A)

A biaxially stretched film (stretch ratio: 3×3 times, thickness: 12 μm) composed of PVA having a saponification degree of 99.9 mol % was used as a base film, and a transparent SO thin film of 1000 Å in thickness was formed on one side thereof by evaporating silicon oxide (SiO) having a purity of 99.9% under heating by an electron beam under a vacuum of $5 \times 10^{-5}$ torr.

Laminated film (B)

A combination of the following laminated films (B-1) and (B-2) was used.

(1) Laminated film (B-1)

Two biaxially stretched polyethylene terephthalate (hereinunder referred to as "PET") films each having an SO thin film of 1000 Å in thickness formed on one side thereof in the same way as in the laminated film (A) and a stretch ratio of 3×3 times and a thickness of 12 μm were prepared. The SO thin film of one of the PET films was bonded to the non-SO thin film side of the other PET film through an urethane adhesive.

(2) Heat-resistant film (B-2)

An unstretched polyether sulfone film 50 μm in thickness was prepared. The percentage of shrinkage of the film after being heated at 150° C. for 30 minutes was 0.10% in the machine direction (MD) and 0.09% in the transverse direction (TD), and the light transmittance thereof was 88%.

Sealant film (C)

An unstretched film of an ethylene-ethyl acrylate copolymer (EEA) having a thickness of 50 μm was prepared.

The SO thin film side of the laminated film (A) was first bonded to the non-SO thin film side of the laminated film (B-1) through an urethane adhesive (hereinunder referred to simply as "adhesive"). The SO thin film side of the bonded laminated film was then bonded to the heat-resistant film (B-1) through an adhesive, thereby producing a four-layered laminated film.

The sealant film (C) was bonded to the laminated film (A) of the four-layered laminated film through an adhesive, thereby producing a transparent five-layered film, as shown in FIG. 4.

EXAMPLES 2 to 7, COMPARATIVE EXAMPLES 1 to 5

Various laminated films were obtained in the same way as in Example 1 except that the structure of the laminated films was varied as shown in Table 1.

The moisture permeability and the transparency of the laminated films obtained were measured by the above-described methods. The results of the measured physical properties are shown in Table 1 together with the structures of the respective laminated films.

In Table 1, the heat-resistant films (B-2) are represented by the following.

PES: a film of a polyether sulfone having the repeating unit represented by the chemical formula (1) [TALPA-1000 (trade name) produced by Mitsui Toatsu Chemical Inc.] (Tg: 225° C.) .

PSF: a film of a polysulfone having the repeating unit represented by the chemical formula (2) [SUMILITE FS-1300 (trade name) produced by Sumitomo Bakelite Co., Ltd.] (Tg: 223° C.), PAr: a film of a polyarylate having the repeating unit represented by the chemical formula (11) [Espex-R (trade name) produced by Sumitomo Chemical Co., Ltd.] (Tg: 193° C.).

PI: a film of a polyimide having the repeating unit represented by the chemical formula (17) .

PET: a polyethylene terephthalate film.

The sealant films in Examples 2 to 7 and Comparative Examples 1 to 5 have the same structure as that in Example 1.

TABLE 1

| Examples & Comparative Examples | First Layer (A) | | | Second Layer (B) | | | | |
|---|---|---|---|---|---|---|---|---|
| | | | | (B-1) | | | (B-2) | |
| | Kind of Film | Saponification Degree (mol %) | Thickness of SO Thin Film (Å) | Kind of Film | Thickness of SO thin Film (Å) | Number of Film | Kind of Film | Thickness (μm) |
| Example 1 | PVA | 99.9 | 1000 | PET | 1000 | 2 | PES | 50 |
| Example 2 | PVA | 99.9 | 1000 | PET | 1000 | 2 | PES | 25 |
| Example 3 | PVA | 99.9 | 1000 | PET | 1000 | 2 | PSF | 50 |
| Example 4 | PVA | 99.9 | 1000 | PET | 1000 | 2 | PAr | 50 |
| Example 5 | PVA | 99.9 | 100 | PET | 1000 | 2 | PES | 50 |
| Example 6 | PVA | 99.9 | 1000 | PET | 100 | 2 | PES | 50 |
| Example 7 | PVA | 99.9 | 1000 | PET | 1000 | 1 | PES | 50 |
| Comparative Example 1 | PET | — | 1000 | PET | 1000 | 2 | PES | 50 |
| Comparative Example 2 | PVA | 94.0 | 1000 | PET | 1000 | 2 | PES | 50 |
| Comparative Example 3 | PVA | 99.9 | 1000 | PET | 50 | 2 | PES | 50 |
| Comparative Example 4 | PVA | 99.9 | 1000 | PET | 1000 | 2 | PET | 50 |
| Comparative Example 5 | PVA | 99.9 | 1000 | PET | 1000 | 2 | PI | 50 |

| Examples & Comparative Examples | Second Layer (B) (B-2) | | Light Transmittance (%) | Total Thickness (containing sealatnt film) (μm) | Moisture Premeability (gr/m$^2$ · 24 H) 50° C. × 90% RH | Transparency (%) |
|---|---|---|---|---|---|---|
| | Heat-Shinkage (%) | | | | | |
| | MD | TD | | | | |
| Example 1 | 0.10 | 0.09 | 88 | 186 | 0.09 | 75 |
| Example 2 | 0.12 | 0.11 | 89 | 161 | 0.12 | 75 |
| Example 3 | 0.07 | 0.04 | 89 | 186 | 0.09 | 75 |
| Example 4 | 0.12 | 0.06 | 90 | 186 | 0.09 | 76 |
| Example 5 | 0.10 | 0.09 | 88 | 186 | 0.18 | 76 |
| Example 6 | 0.10 | 0.09 | 88 | 186 | 0.21 | 77 |
| Example 7 | 0.10 | 0.09 | 88 | 186 | 0.22 | 77 |
| Comparative Example 1 | 0.10 | 0.09 | 88 | 186 | 1.05 | 75 |
| Comparative Example 2 | 0.10 | 0.09 | 88 | 186 | 1.23 | 75 |
| Comparative Example 3 | 0.10 | 0.09 | 88 | 186 | 1.10 | 78 |
| Comparative Example 4 | 1.25 | 0.22 | 90 | 186 | 3.00 | 75 |
| Comparative Example 5 | 0.07 | 0.16 | 49 | 186 | 0.09 | 39 |

As is seen from Table 1, a heat-resistant moistureproof film having improved moisture permeability and transparency is produced when the second layer (B) includes a predetermined transparent heat-resistant film.

The heat-resistant moistureproof film according to the present invention has excellent transparency and very excellent moisture resistance. It has also flexibility and high mechanical strength and economical efficiency. Even if the film is used under severe conditions for a long time, the moisture resistance does not deteriorate.

Accordingly, the heat-resistant moistureproof film according to the present invention is suitable as a packaging film for an EL device for a back light of a liquid crystal display, which is used under severe conditions for a long time and, hence, required to have a high moisture resistance. Thus, the present invention has a high industrial value.

What is claimed is:

1. A heat-resistant moistureproof film comprising:
   a first layer (A), the first layer (A) being a transparent laminated film comprising:
   a base film composed of a polyvinyl alcohol having a saponification degree of not less than 99 mol%; and,
   a first transparent silicon oxide thin film formed on at least one side of the base film;
   a second layer (B) bonded to one side of the first layer (A), the second layer (B) comprising:
   at least one layer of a transparent plastic film other than a polyvinyl alcohol film; and,
   a second transparent silicon oxide thin film of 100 to 5000 Å in thickness formed on at least one side of the transparent plastic film; and,
   at least one transparent plastic film being a heat-resistant film having a sum of the absolute values of percentages of heatshrinkage in a machine direction and a transverse direction when heated at 150° for 30 minutes, of not more than 1% and a light transmittance of not less than 85% by ASTM D-1003; and,
   a third layer (C) bonded to an opposing side of the first layer (A), the third layer (C) being a heat-sealable resin layer.

2. A heat-resistant moistureproof film according to claim 1, wherein said transparent heat-resistant film has a thickness of 10 to 100 μm.

3. A heat-resistant moistureproof film according to claims 1, wherein said transparent heat-resistant film is composed of a polyether sulfone having a repeating unit represented by the following chemical formula:

4. A heat-resistant moistureproof film according to claims 1, wherein said first and second silicon oxide thin films are formed by one of the methods selected from the group consisting of vacuum deposition method, sputtering method and ion plating method.

5. A heat-resistant moistureproof film according to claims 1, wherein said base film and said first silicon oxide thin film of said first layer (A) have thicknesses of 5 to 400 μm and 100 to 5000 Å, respectively, and the total thickness of said second layer (B) and said third layer (C) is 50 to 1000 μm.

6. A heat-resistant moistureproof film according to claim 2, wherein said transparent heat-resistant film is composed of a polyether sulfone having a repeating unit represented by the following chemical formula:

7. A heat-resistant moistureproof film according to claim 2, wherein said first and second silicone oxide thin films are formed by one of the methods selected from the group consisting of vacuum deposition method, sputtering method and ion plating method.

8. A heat-resistant moistureproof film according to claim 3, wherein said first and second silicone oxide thin films are formed by one of the methods selected from the group consisting of vacuum deposition method, sputtering method and ion plating method.

9. A heat-resistant moistureproof film according to claim 6, wherein said first and second silicone oxide thin films are formed by one of the methods selected from the group consisting of vacuum deposition method, sputtering method and ion plating method.

10. A heat-resistant moistureproof film according to claim 2, wherein said base film and said first silicon oxide thin film of said first layer (A) have thicknesses of 5 to 400 μm and 100 to 5000 Å, respectively, and the total thickness of said layer (B) and said third layer (C) is 50 to 1000 μm.

11. A heat-resistant moistureproof film according to claim 3, wherein said base film and said first silicon oxide thin film of said first layer (A) have thicknesses of 5 to 400 μm and 100 to 5000 Å, respectively, and the total thickness of said layer (B) and said third layer (C) is 50 to 1000 μm.

12. A heat-resistant moistureproof film according to claim 4, wherein said base film and said first silicon oxide thin film of said first layer (A) have thicknesses of 5 to 400 μm and 100 to 5000 Å, respectively, and the total thickness of said layer (B) and said third layer (C) is 50 to 1000 μm.

13. A heat-resistant moistureproof film according to claim 6, wherein said base film and said first silicon oxide thin film of said first layer (A) have thicknesses of 5 to 400 μm and 100 to 5000 Å, respectively, and the total thickness of said layer (B) and said third layer (C) is 50 to 1000 μm.

14. A heat-resistant moistureproof film according to claim 7, wherein said base film and said first silicon oxide thin film of said first layer (A) have thicknesses of 5 to 400 μm and 100 to 5000 Å, respectively, and the total thickness of said layer (B) and said third layer (C) is 50 to 1000 μm.

15. A heat-resistant moistureproof film according to claim 8, wherein said base film and said first silicon oxide thin film of said first layer (A) have thicknesses of 5 to 400 μm and 100 to 5000 Å, respectively, and the total thickness of said layer (B) and said third layer (C) is 50 to 1000 μm.

16. A heat-resistant moistureproof film according to claim 9, wherein said base film and said first silicon oxide thin film of said first layer (A) have thicknesses of 5 to 400 μm and 100 to 5000 Å, respectively, and the total thickness of said layer (B) and said third layer (C) is 50 to 1000 μm.

* * * * *